United States Patent
Langbak et al.

(10) Patent No.: US 12,264,647 B1
(45) Date of Patent: Apr. 1, 2025

(54) METHOD FOR TRACKING A GEAR TOOTH MESHING ANGLE OF A GEARBOX OF A WIND TURBINE

(71) Applicant: VESTAS WIND SYSTEMS A/S, Aarhus N (DK)

(72) Inventors: Andreas Langbak, Aalborg (DK); Peter Mongeau, Center Conway, NH (US); Ciprian Biris, Hadsten (DK); Kent Tange, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/885,286

(22) Filed: Sep. 13, 2024

Related U.S. Application Data

(60) Provisional application No. 63/609,057, filed on Dec. 12, 2023.

(30) Foreign Application Priority Data

Jan. 18, 2024 (DK) .......................... PA 2024 30026

(51) Int. Cl.
*F03D 15/00* (2016.01)
*F03D 7/02* (2006.01)
(Continued)

(52) U.S. Cl.
CPC ......... *F03D 17/033* (2023.08); *F03D 15/101* (2023.08); *F03D 17/006* (2023.08);
(Continued)

(58) Field of Classification Search
CPC .... F03D 17/003; F03D 17/001; F03D 17/005; F03D 17/017; F03D 17/015;
(Continued)

(56) References Cited

U.S. PATENT DOCUMENTS

2014/0046614 A1* 2/2014 Pettersson ........... G01M 13/021
702/113
2014/0375055 A1* 12/2014 Moerbe ................. F03D 7/0272
290/44
(Continued)

FOREIGN PATENT DOCUMENTS

EP 2498076 A1 * 9/2012 .......... G01M 13/021
WO WO-2023117019 A1 * 6/2023
WO WO-2023213367 A1 * 11/2023 ............. F03D 15/00

OTHER PUBLICATIONS

Danish Patent and Trademark Office, 1st Technical Examination including The Search Opinion and Search Report for Application PA 2024 30026 dated Jul. 15, 2024.

*Primary Examiner* — Jeffrey P Aiello
(74) *Attorney, Agent, or Firm* — Patterson + Sheridan, LLP

(57) ABSTRACT

A method for tracking a gear tooth meshing angle of a gearbox of a wind turbine is disclosed. An initial reference virtual gear tooth meshing angle of the gearbox is selected, and an angular position of a high speed shaft and/or a low speed shaft of the gearbox is monitored. A virtual gear tooth meshing angle relative to the reference virtual gear tooth meshing angle is estimated, based on the monitored angular position of the high speed shaft and/or the low speed shaft and on information regarding topology of the gearbox. A number of full rotations of the high speed shaft and/or the low speed shaft which corresponds to an integer number of full periods of gear meshing of the gearbox is calculated, and the reference virtual gear tooth meshing angle is reset each time the high speed shaft and/or the low speed shaft has performed the calculated number of full rotations. The estimated virtual gear tooth meshing angle is applied to a periodic noise signal of the wind turbine.

9 Claims, 3 Drawing Sheets

(51) Int. Cl.
 *F03D 15/10* (2016.01)
 *F03D 17/00* (2016.01)
(52) U.S. Cl.
 CPC ......... *F03D 17/017* (2023.08); *F03D 17/031* (2023.08); *F05B 2270/1032* (2013.01)
(58) Field of Classification Search
 CPC .... F03D 17/031; F03D 17/033; F03D 17/032; F03D 17/006; F03D 17/0065; F03D 17/00; F03D 7/0296; F03D 15/101; F03D 15/10; F03D 15/00; F05B 2260/4031; F05B 2260/96; F05B 2270/334; Y02E 10/72; G01M 13/028; G01M 13/045; G01M 13/04; G01M 13/021; G01M 13/02; G01M 15/046; G01M 15/12; G01H 1/003
 USPC ......... 73/162, 660, 593, 570, 64.53; 702/34, 702/33, 35, 41, 56, 151, 183, 188, 182, 702/94, 181, 150, 185, 187, 113, 145, 702/167, 105, 138; 703/7
 See application file for complete search history.

(56) References Cited

U.S. PATENT DOCUMENTS

2017/0138819 A1* 5/2017 Liu ....................... G01M 13/02
2019/0078974 A1* 3/2019 Nowoisky ........... G01M 13/021

\* cited by examiner

METHOD FOR TRACKING A GEAR TOOTH MESHING ANGLE OF A GEARBOX OF A WIND TURBINE

FIELD OF THE INVENTION

The present invention relates to a method for tracking a gear tooth meshing angle of a gearbox of a wind turbine. More particularly, the method according to the invention allows the gear tooth meshing angle to be tracked in a very accurate manner, without requiring measurements inside the gearbox. The tracked gear tooth meshing angle obtained by means of the method according to the invention may, e.g., be applied for generating a torque modulation signal for a generator of the wind turbine, so as to reduce tonality originating from gear meshing.

BACKGROUND OF THE INVENTION

When operating a wind turbine, various movable parts of the wind turbine generate structure-borne vibrations and associated air-borne noise, which may be amplified by various other structures of the wind turbine, such as tower, wind turbine blades, etc. This is sometimes referred to as tonality. This may result in air-borne noise levels in the vicinity of the wind turbine which annoy neighbours or disturb animal life, and the noise may even approach or exceed allowable noise limits. It is therefore desirable to reduce such noise.

One source of wind turbine noise is vibrations originating from operation of the generator. Another source is vibrations originating from the drive train, e.g. from gear tooth meshing in the gearbox. In combination, vibrations originating from the generator and vibrations originating from the drive train constitute vibrations of the power train of the wind turbine, and thereby noise of the wind turbine as a whole.

In order to mitigate the part of the noise which originates from gear tooth meshing in the gearbox, it may be desirable to track the gear tooth meshing angle. However, this would normally require measurements at interior positions of the gearbox during operation, and this is considered cumbersome and technically challenging.

DESCRIPTION OF THE INVENTION

It is an object of embodiments of the invention to provide a method for accurately tracking a gear tooth meshing angle of a gearbox of a wind turbine, without requiring measurements at interior positions of the gearbox.

The invention provides a method for tracking a gear tooth meshing angle of a gearbox of a wind turbine, the method comprising the steps of:

selecting an initial reference virtual gear tooth meshing angle of the gearbox, monitoring an angular position of a high speed shaft and/or a low speed shaft of the gearbox, estimating a virtual gear tooth meshing angle relative to the reference virtual gear tooth meshing angle, based on the monitored angular position of the high speed shaft and/or the low speed shaft and on information regarding topology of the gearbox, calculating a number of full rotations of the high speed shaft and/or the low speed shaft which corresponds to an integer number of full periods of gear meshing of the gearbox, based on information regarding topology of the gearbox, resetting the reference virtual gear tooth meshing angle each time the high speed shaft and/or the low speed shaft has performed the calculated number of full rotations, and continuing monitoring the angular position of the high speed shaft and/or the low speed shaft and continuing estimating the virtual gear tooth meshing angle relative to the reset reference virtual gear tooth meshing angle, and applying the estimated virtual gear tooth meshing angle to a periodic noise signal of the wind turbine.

Thus, the method according to the invention is a method for tracking a gear tooth meshing angle of a gearbox of a wind turbine. The wind turbine normally further comprises a rotor and a generator, and the gearbox interconnects the rotor and the generator. Thus, during operation of the wind turbine, wind acts on the rotor and causes the rotor to rotate. The rotational movement of the rotor is transmitted to the generator, via the gearbox, and transformed into electrical energy which may be supplied to a power grid. Accordingly, the gearbox is connected to the rotor via a low speed shaft and to the generator via a high speed shaft, and the gearbox comprises a number of gear stages and meshing gears.

In the present context the term 'gear tooth meshing angle' should be interpreted to mean a relative position between meshing gear teeth along a cycle or period of gear tooth meshing.

In the method according to the invention, an initial reference virtual gear tooth meshing angle of the gearbox is initially selected. The initial reference virtual gear tooth meshing angle serves as a reference point or starting point for an evolving gear tooth meshing angle. However, it is 'virtual' in the sense that it is not directly linked to an actual, physical gear tooth meshing angle in the gearbox, and knowledge regarding the actual, physical relative positions of the meshing gear teeth is not required in order to select the initial reference virtual gear tooth meshing angle.

Next, an angular position of a high speed shaft and/or a low speed shaft of the gearbox is monitored. This could, e.g., be done by means of a suitable encoder or another relevant kind of sensor being capable of keeping track of the rotational movements of the relevant shaft.

Next, a virtual gear tooth meshing angle is estimated, relative to the reference virtual gear tooth meshing angle. Thus, the estimated virtual gear tooth meshing angle refers to the initially selected reference virtual gear tooth meshing angle, and not to an actual physical reference angle. The estimation of the virtual gear tooth meshing angle is performed based on the monitored angular position of the high speed shaft and/or the low speed shaft and on information regarding topology of the gearbox.

Furthermore, the estimated virtual gear tooth meshing angle is 'virtual' in the sense that it, contrary to the actual, physical gear tooth meshing angle, has a fixed progression along its period and is not subject to gear mesh transmission error. In the present context the term 'transmission error' should be interpreted to mean a physical characteristic for the gearbox, in the form of a difference in torsional vibration of two meshing gears, scaled so as to represent linear motion along the line of action, and where the internal components of the gearbox, e.g., elastically 'wind-up' and twist relative to each other as a function of torque load.

Three distinct types of transmission error may be relevant:
1. Geometric transmission error given by deviations of the tooth profiles from ideal involute.
2. Static transmission error including elastic deformation of teeth. Thus, static transmission error is load dependent.

3. Dynamic transmission error including inertial as well as stiffness effects. Thus, dynamic transmission error is speed dependent as well as load dependent.

The topology of the gearbox, such as gear ratio, number of gear stages, number of meshing gear teeth of the various stages, etc., defines how the rotational movements of the rotor are transferred to the generator. For instance, the topology of the gearbox is highly relevant with regard to mutual relationships between rotations of the low speed shaft, rotations of the high speed shaft, gear tooth meshing, etc. Therefore, based on the monitored angular position of the low speed shaft and/or the high speed, and applying knowledge regarding the topology of the gearbox, it is possible to estimate how much the gear tooth meshing angle has moved relative to the reference virtual gear tooth meshing angle, when the angular position of the low speed shaft and/or the high speed shaft has moved a certain angular distance. Accordingly, this alone would allow for tracking of the gear tooth meshing angle, at least with respect to an arbitrary starting point or reference point.

However, due to integration errors of the gearbox, such tracking of the virtual gear tooth meshing angle will eventually accumulate and drift to an extent where it fails to accurately correspond to evolvement of the actual, physical gear tooth meshing angle. In order to avoid this, the following process is performed.

Initially, a number of full rotations of the high speed shaft and/or the low speed shaft which corresponds to an integer number of full periods of gear meshing of the gearbox is calculated, based on information regarding topology of the gearbox. For instance, information regarding gear ratio of the gearbox may be relevant for calculating the number of full rotations, also when the gear ratio is a non-integer gear ratio. This will be described in further detail below. Thus, the calculated number specifies that when the high speed shaft and/or the low speed shaft has performed a corresponding number of full rotations, it can be expected that the gear meshing of the gearbox has also moved through an integer number of full periods. Accordingly, the gear meshing may be expected to be back at a position corresponding to the reference virtual gear tooth meshing angle.

Accordingly, each time the high speed shaft and/or the low speed shaft has performed the calculated number of full rotations, the reference virtual gear tooth meshing angle is reset. Subsequently, the monitoring of the angular position of the high speed shaft and/or the low speed shaft is continued, and the estimation of the virtual gear tooth meshing angle, based on the monitored angular position of the high speed shaft and/or the low speed shaft, in the manner described above, is also continued. However, the virtual gear tooth meshing angle is now estimated relative to the reset reference virtual gear tooth meshing angle.

This efficiently prevents that the estimated virtual gear tooth meshing angle is allowed to drift significantly relative to the evolvement of the actual, physical gear meshing angle. Accordingly, even though the estimated virtual gear tooth meshing angle is not directly linked to a specific, actual and absolute gear tooth meshing angle of the gearbox, the evolvement and periodicity of the estimated virtual gear tooth meshing angle accurately corresponds to the evolvement and periodicity of the actual and absolute gear tooth meshing angle. Therefore, tracking the estimated virtual gear tooth meshing angle corresponds to accurately tracking the actual and absolute gear tooth meshing angle. Furthermore, this is obtained in an easy manner, since it requires only monitoring of the angular position of the high speed shaft and/or the low speed shaft, which can be readily obtained. In particular, no measurements at interior positions of the gearbox are required.

Finally, the estimated virtual gear tooth meshing angle is applied to a periodic noise signal of the wind turbine. The virtual gear tooth meshing angle represents a perfect gear meshing angle, e.g. without transmission errors, integration errors, etc., which has the exact same periodicity as the actual, physical gear tooth meshing angle, without being tied to the exact position of the actual physical gear tooth meshing angle, which is subject to, e.g., transmission error. Therefore the virtual gear tooth meshing angle can be used for describing gear tooth driven vibrations which have the same periodicity.

The concept of using a virtual gear tooth meshing angle for describing gear mesh related vibrations is not trivial. Although the gear mesh in any gearbox has a very well defined and exact ratio between the gear mesh period and that of the low speed shaft and/or the high speed shaft, the physical gear tooth meshing angle does not follow an exact, smoothly increasing periodic angle. For instance, the rolling line contact in the gear mesh surfaces is not perfect, and therefore it is not possible for the physical gear tooth meshing angle to provide a perfect and smooth progression function, even under ideal conditions. Furthermore, the gear mesh surfaces tend to deform under load, thus making these gear tooth meshing angle perturbations further from being perfect. Finally, the torsional wind-up of elements within the drivetrain, e.g. due to transmission error as described above, further disturb a perfect progression of gear tooth meshing angle. The inventors of the present invention have surprisingly realised that the ideal virtual gear tooth meshing angle described above is able to describe a single and perfect angle that, itself, is not subject to the physical errors, such as transmission errors, and that this can be used as a universal and perfect reference for gear mesh related vibrations.

The method may further comprise the step of calibrating the estimated virtual gear tooth meshing angle each time the high speed shaft and/or the low speed shaft has performed a full rotation.

It is relatively simple to keep track of when a rotating shaft, such as a high speed shaft or a low speed shaft of a gearbox, has performed a full rotation. This could, e.g., be done by means of a suitable encoder that generates a signal each time this is the case. Moreover, since there is a fixed relationship, determined by the topology of the gearbox, between the rotating angle of the rotating shaft and the gear tooth meshing angle, it is also possible to predict how much the gear tooth meshing angle has changed during this full rotation of the rotating shaft. This information can therefore by used for calibrating or adjusting the estimated virtual gear tooth meshing angle. Thereby it is avoided that the estimated virtual gear tooth meshing angle is allowed to drift due to integration errors or rounding errors between two resets of the reference virtual gear tooth meshing angle, and a very accurate estimate is maintained.

The calibration may, e.g., be based on a look-up table providing mutually corresponding values of angular position of the relevant shaft and gear tooth meshing angle.

The step of monitoring the angular position of the high speed shaft and/or the low speed shaft of the gearbox may be performed by means of an incremental encoder. Incremental encoders are particularly well suited for accurately keeping track of the angular position of a rotating shaft, since they generate a pulse each time the rotating shaft has performed a full rotation. Furthermore, the incremental encoder keeps track of the angular position of the rotating shaft within the respective full rotations in the form of incremental progression steps. This is a very accurate and reliable way of keeping track of the angular position.

The topology of the gearbox may define a non-integer gear meshing ratio related to the low speed shaft and/or to the high speed shaft, the gear meshing ratio being a ratio with an integer numerator and an integer denominator, and the step of resetting the reference virtual gear tooth meshing angle may be performed each time the high speed shaft and/or the low speed shaft has performed a number of full rotations being equal to the denominator of the non-integer gear ratio.

According to this embodiment, the gear meshing ratio related to the low speed shaft and/or the gear meshing ratio related to the high speed shaft is a non-integer. In this case, if the gear tooth meshing angle is simply estimated based on the angular position of the high speed shaft and/or the low speed shaft and the non-integer gear meshing ratio, without the resetting of the reference virtual gear tooth meshing angle described above, then the estimated gear tooth meshing angle will be subject to rounding errors which may accumulate and result in substantial drifting of estimated gear tooth meshing angle relative to the actual, physical gear tooth meshing angle. Therefore, the method according to the invention is highly relevant for gearboxes defining a non-integer gear meshing ratios.

However, when the high speed shaft and/or the low speed shaft has performed a number of full rotations being equal to the integer denominator of the non-integer gear meshing ratio, then the gear tooth meshing of the gearbox will also have performed an integer number of full periods. Accordingly, when this occurs, it is a suitable time for resetting the reference virtual gear tooth meshing angle.

The step of estimating a virtual gear tooth meshing angle of the gearbox may comprise multiplying the monitored angular position and a non-integer gear meshing ratio of the gearbox. According to this embodiment, between the periodic resetting of the reference virtual gear tooth meshing angle, the virtual gear tooth meshing angle is simply estimated from the angular position of the high speed shaft and/or the low speed shaft and a relevant known non-integer gear meshing ratio of the gearbox, e.g. the gear meshing ratio between the low speed shaft and a ring gear and/or the gear meshing ratio between the high speed shaft and a sun gear. Since the gear meshing ratio is non-integer, this estimate will introduce rounding errors, but it may still be considered an acceptable approximation during the relatively short interval between the periodic resetting of the reference virtual gear tooth meshing angle.

The gear meshing ratios may include harmonics or multiples thereof. For instance, the gear meshing ratios may be or include first order gear meshing terms, second order gear meshing terms, third order gear meshing terms, etc.

The method may further comprise the steps of generating a torque modulation signal for a generator connected to the gearbox, based on the estimated virtual gear tooth meshing angle of the gearbox, and injecting the generated torque modulation signal into the generator.

In the present context the term 'torque modulating signal' should be interpreted to mean a control signal which defines an AC torque sinus which can be added on top of a DC power producing torque of the generator. Accordingly, a torque modulating signal being applied to the generator modulates the torque output of the generator.

Thus, according to this embodiment, the torque output of the generator is modulated in a manner which takes the estimated virtual gear tooth meshing angle of the gearbox into account. Since the estimated virtual gear tooth meshing angle is representative for the periodicity of the actual, physical gear tooth meshing angle, properties of the actual gear tooth meshing angle are also taken into account. Thus, the torque modulation signal can be generated in such a manner that, when the torque modulation signal is injected into the generator, vibrations caused by gear tooth meshing in the gearbox are addressed or mitigated, thus reducing tonality of the power train of the wind turbine.

The step of generating a torque modulation signal may comprise the steps of:
  measuring vibrations originating from gear tooth meshing of the gearbox, and
  generating the torque modulation system so as to fit the estimated gear tooth meshing angle and so as cause an observed vibration originating from the gearbox to be minimised.

According to this embodiment, the torque modulation signal is generated based on the gear tooth meshing angle, as well as on frequency and/or amplitude of observed vibrations originating from the gearbox. Thus, the torque modulation signal can be generated in such a manner that the subsequent operation of the generator exactly counteracts the vibrations originating from gear meshing of the gearbox, thus reducing tonality.

The method may further comprise the step of applying the estimated virtual gear tooth meshing angle to generate a periodic sinusoidal torque oscillation inside the generator. This could, e.g., include generating a torque modulation signal as described above.

The step of applying the estimated virtual gear tooth meshing angle to a periodic noise signal of the wind turbine may comprise applying the estimated virtual gear tooth meshing angle as a reference frame to obtain vibration signal amplitude and phase.

As described above, the virtual gear tooth meshing angle represents a perfect periodic function with a periodicity being exactly the same as the periodicity of the actual, physical gear tooth meshing angle. Therefore the virtual gear tooth meshing angle provides a suitable reference system that can be used for describing all real gear tooth driven vibrations having the same periodicity. Any gear mesh driven observable, such as vibration, sound, gear mesh displacement, etc., need to have a reference system for which to describe their relative phase angle. The virtual gear meshing angle provides such a common and global reference frame that all such vectors can be described in reference to. This is, e.g., relevant with regard to torque modulation.

BRIEF DESCRIPTION OF THE DRAWINGS

The invention will now be described in further detail with reference to the accompanying drawings in which.

DETAILED DESCRIPTION OF THE DRAWINGS

Figure 1:
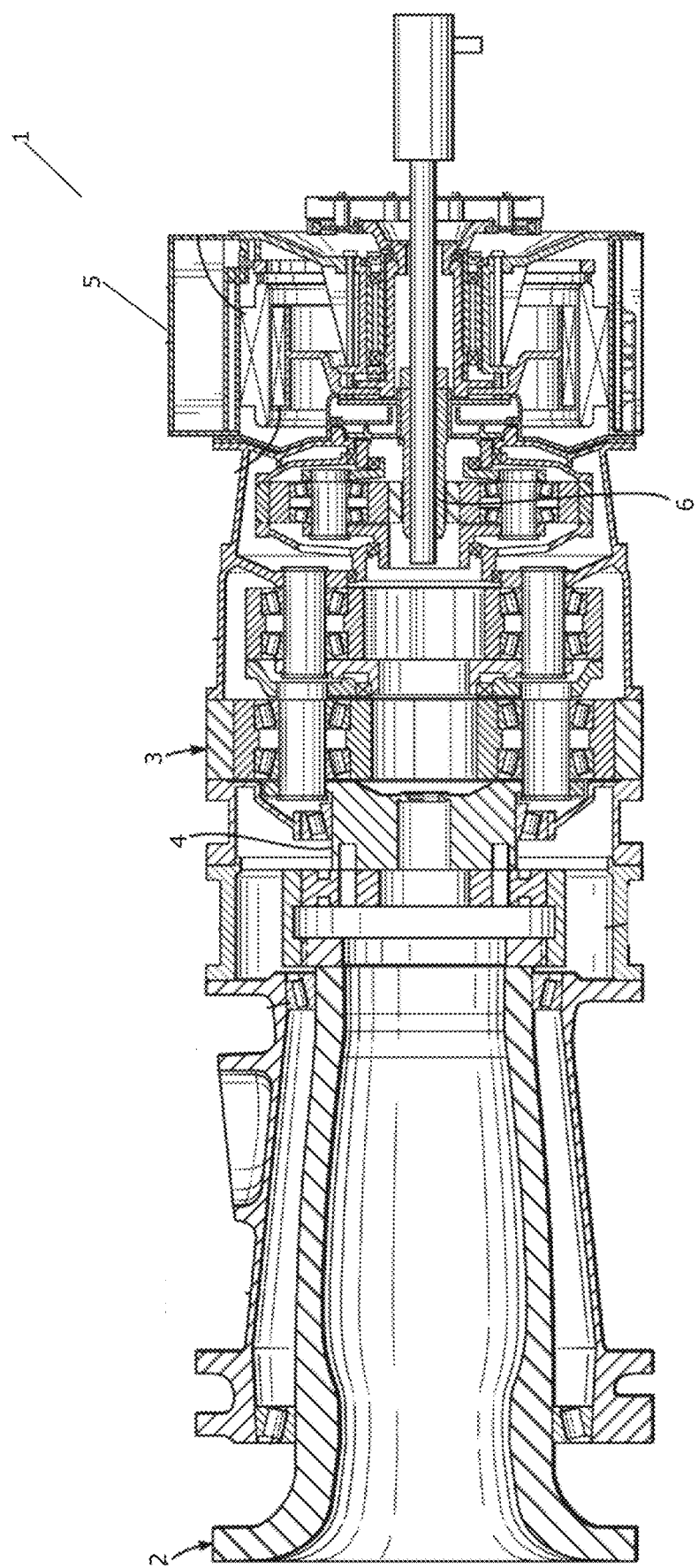
FIG. 1 is a cross sectional view of a power train of a wind turbine, being controlled in accordance with a method according to an embodiment of the invention.

FIG. 1 is a cross sectional view of a power train 1 of a wind turbine being controlled in accordance with a method according to an embodiment of the invention. The power train 1 comprises a main shaft 2 connected to a rotor (not shown) of the wind turbine, a gearbox 3 connected to the main shaft 2 via an input shaft, or low speed shaft 4, and a generator 5 connected to the gearbox 3 via an output shaft, or high speed shaft 6.

The generator 5 may be controlled in such a manner that an observed vibration originating from the gearbox 3 is minimised. This is obtained by estimating a virtual gear tooth meshing angle of the gearbox 3, generating a torque modulation signal for the generator 5, based on the estimated virtual gear tooth meshing angle of the gearbox 3, and injecting the generated torque modulation signal into the generator 5.

The virtual gear tooth meshing angle may be estimated in the following manner. An initial reference virtual gear tooth meshing angle is initially selected, and an angular position of the high speed shaft 6 and/or the low speed shaft 4 is monitored. This could, e.g., be done by means of an encoder, such as an incremental encoder.

A virtual gear tooth meshing angle relative to the reference virtual gear tooth meshing angle is then estimated, based on the monitored angular position of the high speed shaft 6 and/or the low speed shaft 4 and on information regarding topology of the gearbox 3, e.g. including information regarding a gear meshing ratio, e.g. a non-integer gear meshing ratio, of the gearbox 3. The estimated virtual gear tooth meshing angle is representative for the actual, physical gear tooth meshing angle of the gearbox 3 in the sense that it evolves essentially in the same manner as the actual, physical gear tooth meshing angle, e.g. with the same periodicity, governed by the topology of the gearbox 3. However, the estimated virtual gear tooth meshing angle refers to the selected reference virtual gear tooth meshing angle, rather than to an actual, physical reference gear tooth meshing angle. Furthermore, the estimated virtual gear tooth meshing angle may drift relative to the actual, physical gear tooth meshing angle due to integration errors and/or rounding errors. In order to prevent the estimated virtual gear tooth meshing angle from drifting unacceptably, the reference virtual gear tooth meshing angle is periodically reset in the following manner.

A number of full rotations of the high speed shaft 6 and/or the low speed shaft 4 which corresponds to an integer number of full periods of gear meshing of the gearbox 3 is calculated, based on information regarding topology of the gearbox 3. In the case that the gearbox 3 defines a non-integer gear meshing ratio related to the low speed shaft 4 and/or to the high speed shaft 6, and the gear meshing ratio is a ratio with an integer numerator and an integer denominator, then the calculated number may be the integer denominator of the non-integer gear ratio.

When the high speed shaft 6 and/or the low speed shaft 4 has performed the calculated number of full rotations, it is known that the gear meshing of the gearbox 3 has performed an integer number of full periods, and that the position of the gears of the gearbox 3 are therefore back to the position defined by the reference virtual gear tooth meshing angle. Therefore the reference virtual gear tooth meshing angle is reset each time the high speed shaft 6 and/or the low speed shaft 4 has performed the calculated number of full rotations. Subsequently, the monitoring of the angular position of the high speed shaft 6 and/or the low speed shaft 4 and the estimation of the virtual gear tooth meshing angle are continued, but now relative to the reset reference virtual gear tooth meshing angle.

Figure 2:
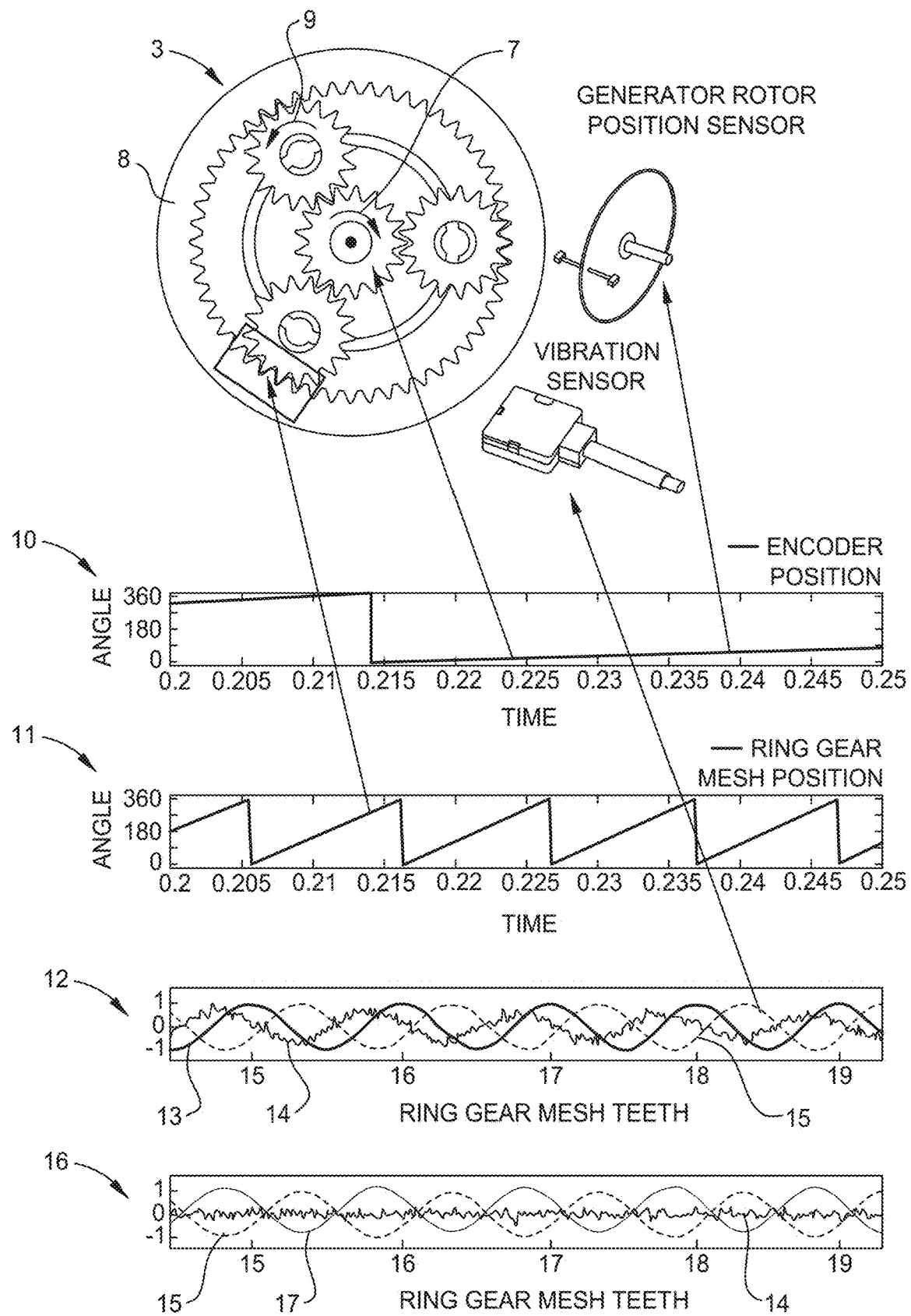
FIG. 2 illustrates tracking of a gear tooth meshing angle in accordance with a method according to an embodiment of the invention.

FIG. 2 illustrates tracking of a gear tooth meshing angle in accordance with a method according to an embodiment of the invention. A gearbox 3 comprises a planetary gear system with a sun gear 7 connected to a high speed shaft, a ring gear 8 connected to a low speed shaft, and a planetary stage comprising three planetary gears 9 interconnecting the sun gear 7 and the ring gear 8.

The angular position of the high speed shaft, and thus of the sun gear 7, is monitored by means of an incremental encoder. The output from the incremental encoder is shown in graph 10, illustrating the angular position of the high speed shaft as a function of the time. Each time the high speed shaft has performed a full rotation, the incremental encoder generates a signal, and the angular position of the high speed shaft is reset to zero and a new revolution of the high speed shaft is commenced. This can be seen as an abrupt 'jump' shortly before t=0.215.

A gear tooth meshing angle between the ring gear 8 and the planetary gears 9 as a function of time is illustrated in graph 11. The gear tooth meshing angle illustrated in graph 11 has been calculated from the encoder output of graph 10 and information regarding a non-integer gear meshing ratio of the gearbox 3, i.e. the non-integer gear meshing ratio between the ring gear 8, and thus the low speed shaft, and the planet gear 9. Thus, graph 11 represents an estimated virtual gear tooth meshing angle. Similarly to graph 10, the gear tooth meshing angle 'resets to zero' and commences a new revolution each time a full period of virtual gear tooth meshing has been completed. It can be seen that these 'resets to zero' are not coinciding with the 'resets to zero' related to full rotations of the high speed shaft. This is due to the fact that the gear meshing ratio is a non-integer gear meshing ratio. In order to prevent the estimated virtual gear tooth meshing angle 11 from drifting relative to an actual, physical gear tooth meshing angle of the gearbox 3, e.g. due to integration errors and/or rounding errors, the reference virtual gear tooth meshing angle is reset periodically, essentially in the manner described above with reference to FIG. 1.

Graph 12 illustrates a gear tooth meshing position 13 corresponding to estimated virtual gear tooth meshing angle 11, and an output 14 from a vibration sensor measuring observed vibrations originating from the gearbox 3. It can be seen that the output 14 from the vibration sensor follows a substantially sinusoidal curve with a periodicity corresponding to the gear tooth meshing position 13, but phase shifted relative thereto. Finally, graph 12 illustrates a virtual gearbox vibration source 15, in the form of a substantially sinusoidal curve. The virtual gearbox vibration source 15 has a periodicity corresponding to the gear tooth meshing position 13 and the output 14 from the vibration sensor, but is phase shifted relative to both of these. The virtual gearbox vibration source 15 represents a gear tooth meshing periodicity of the gearbox 3 that could be the cause of the measured output 14 from the vibration sensor, and it has been derived from the virtual gear tooth meshing position 13 and the output 14 from the vibration sensor.

All relevant vibrations or variables, e.g. torque modulation variables, are by definition occurring at the gear meshing frequency and have a vector defining an amplitude and a phase angle associated therewith. According to the present invention, the estimated virtual gear meshing angle is applied as a reference system to which these gear mesh related vectors can be defined. For higher order gear mesh related terms, such as second order, third order, etc., the relevant frequency will be two, three, etc., times the gear meshing frequency. Similarly, the gear meshing ratio number will be two, three, etc., times that of the first order gear meshing ratio number.

Graph 16 illustrates the virtual gearbox vibration source 15 of graph 12 and a torque modulation signal 17 for a generator. The torque modulation signal 17 has been generated based on the virtual gearbox vibration source 15, and so as to have the same amplitude and be in antiphase therewith. Thus, the torque modulation signal 17 is generated in such a manner that, when it is injected into the generator, the vibrations originating from gear tooth meshing of the gearbox 3 are counteracted. Finally, graph 16 illustrates the output 14 from the vibration sensor while the torque modulation signal 17 is being injected into the generator. It can be seen that this results in a significant reduction of the measured vibration output 14.

Figure 3:
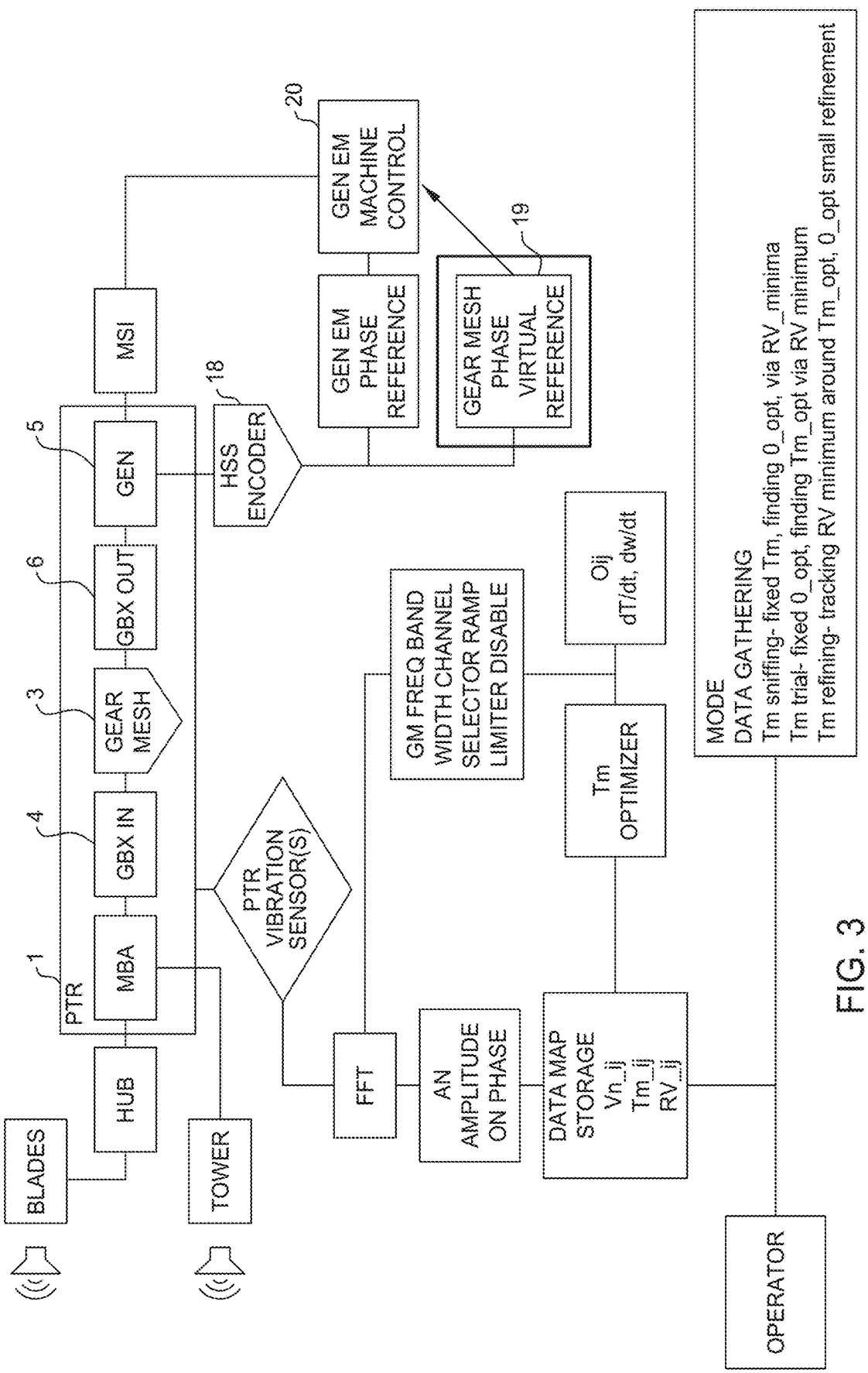
FIG. 3 is a block diagram illustrating a method according to an embodiment of the invention.

FIG. 3 is a block diagram illustrating a method according to an embodiment of the invention. A power train 1 comprising a gearbox 3, a generator 5, a low speed shaft 4 and a high speed shaft 6 is shown. The angular position of the high speed shaft 6 is monitored by means of an encoder 18. Based on the encoder signal and information regarding topology of the gearbox 3, a virtual gear tooth meshing angle is estimated at block 19, e.g. in the manner described above with reference to FIG. 2.

The estimated virtual gear tooth meshing angle is supplied to a generator machine control 20 and applied for generating a torque modulation signal which is subsequently injected into the generator 5 in order to minimise an observed vibration originating from the gearbox 3.

The invention claimed is:

1. A method for tracking a gear tooth meshing angle of a gearbox of a wind turbine, the method comprising the steps of:
    setting a reference virtual gear tooth meshing angle of the gearbox,
    monitoring an angular position of a high speed shaft and/or a low speed shaft of the gearbox,
    estimating a virtual gear tooth meshing angle relative to the reference virtual gear tooth meshing angle, based on the monitored angular position of the high speed shaft and/or the low speed shaft and on information regarding topology of the gearbox,
    calculating a number of full rotations of the high speed shaft and/or the low speed shaft which corresponds to an integer number of full periods of gear meshing of the gearbox, based on information regarding topology of the gearbox,
    resetting the reference virtual gear tooth meshing angle each time the high speed shaft and/or the low speed shaft has performed the calculated number of full rotations, and continuing monitoring the angular position of the high speed shaft and/or the low speed shaft and continuing estimating the virtual gear tooth meshing angle relative to the reference virtual gear tooth meshing angle that has been reset, and
    applying the estimated virtual gear tooth meshing angle to a periodic noise signal of the wind turbine.

2. The method according to claim 1, further comprising the step of calibrating the estimated virtual gear tooth meshing angle each time the high speed shaft and/or the low speed shaft has performed a full rotation.

3. The method according to claim 1, wherein the step of monitoring the angular position of the high speed shaft and/or the low speed shaft of the gearbox is performed by an incremental encoder.

4. The method according to claim 1, wherein the topology of the gearbox defines a non-integer gear meshing ratio related to the low speed shaft and/or to the high speed shaft, the gear meshing ratio being a ratio with an integer numerator and an integer denominator, and wherein the step of resetting the reference virtual gear tooth meshing angle is performed each time the high speed shaft and/or the low speed shaft has performed a number of full rotations being equal to the denominator of the non-integer gear meshing ratio.

5. The method according to claim 1, wherein the step of estimating a virtual gear tooth meshing angle of the gearbox comprises multiplying the monitored angular position and a non-integer gear meshing ratio of the gearbox.

6. The method according to claim 1, further comprising the steps of generating a torque modulation signal for a generator connected to the gearbox, based on the estimated virtual gear tooth meshing angle of the gearbox, and injecting the generated torque modulation signal into the generator.

7. The method according to claim 6, wherein the step of generating a torque modulation signal comprises the steps of:
    measuring vibrations originating from gear tooth meshing of the gearbox, and
    generating the torque modulation signal so as to fit the estimated virtual gear tooth meshing angle and so as cause an observed vibration originating from the gearbox to be minimised.

8. The method according to claim 6, further comprising the step of applying the estimated virtual gear tooth meshing angle to generate a periodic sinusoidal torque oscillation inside the generator.

9. The method according to claim 1, wherein the step of applying the estimated virtual gear tooth meshing angle to a periodic noise signal of the wind turbine comprises applying the estimated virtual gear tooth meshing angle as a reference frame to obtain vibration signal amplitude and phase.

* * * * *